United States Patent Office 3,155,891
Patented Nov. 3, 1964

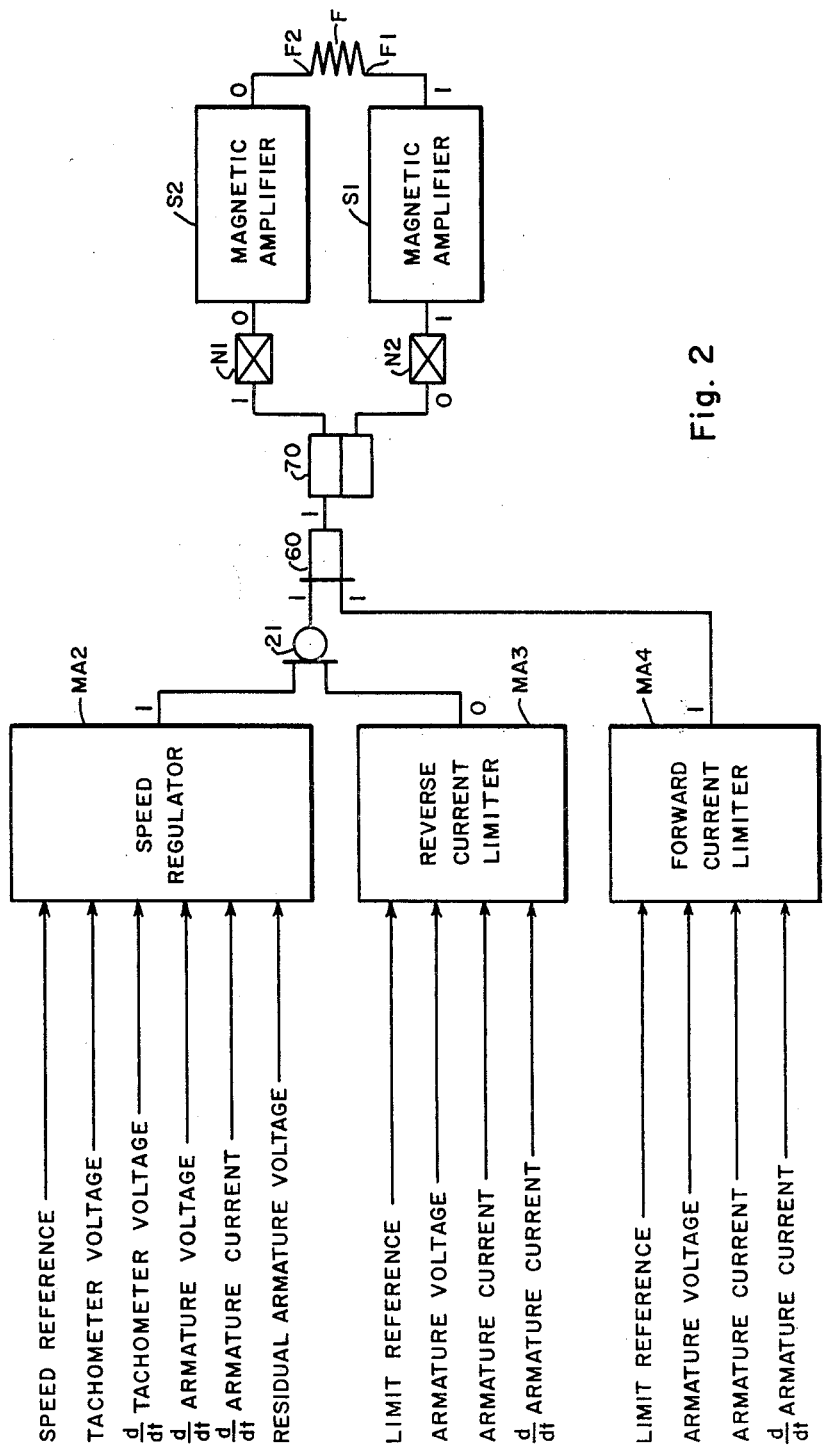

3,155,891
REGULATOR FOR ELECTRODYNAMIC POWER SYSTEM WITH CURRENT LIMITATION
John Rosa, Pittsburgh, Pa., assignor to Westinghouse Electric Corporation, East Pittsburgh, Pa., a corporation of Pennsylvania
Filed July 20, 1961, Ser. No. 125,507
8 Claims. (Cl. 318—143)

In general, this invention relates to an optimum response regulator and more particularly to a static optimum response regulator to be used on a Ward-Leonard type of drive.

The expression "optimum response" is used to denote a closed loop regulating system in which a rate of change of the controlled variable is determined by the full amount of forcing built in the system and not by the magnitude of the error of the controlled variable with the aim of correcting errors of the controlled variable within shortest possible time using the available energy. Thus, an optimum response in this case means time optimum. In the case of a speed regulator, the controlled variable is the signal proportional to the speed, and in the case of a voltage regulator, it is the generator armature voltage.

It is the general object of this invention to provide a better and more improved optimum response regulator.

Another object is to provide an accurate optimum response regulator which will operate over a wide range of reference settings including zero.

Another object of the invention is to provide a fast-acting optimum response regulator which will include adjustable armature current limiting action in all four operating quadrants.

Another object of the invention is to provide an optimum response regulator for use with a Ward-Leonard system in which the armature current is not allowed to exceed limits which are a function of the armature voltage.

Another object of this invention is to provide a static regulator for optimally controlling a controlled variable wherein there is proper isolation of the feedback signals between signals derived from various voltage and power levels.

Another object of the invention is to provide an improved and more versatile optimum response regulator which may be utilized with low level input signals and is capable of a wide range of adjustments to lend the system capable of being applied to machines of various sizes.

Another object of this invention is to provide an optimum response regulator for use with a Ward-Leonard system to control a variable of the system in which the field of the generator is reversibly controlled by the regulator.

Another object of the invention is to provide an improved, faster acting and more reliable optimum response regulator utilizing solid state devices.

The aforesaid objects of the invention and other objects which will become apparent as the description proceeds are achieved by providing a regulator for a Ward-Leonard system which may be used to accurately maintain a controlled variable such as speed or voltage of the motor by reversibly energizing the field of its associated generator. The regulator consists of a bistable transistor and magnetic amplifier circuitry operable to give one of two outputs dependent upon the sign of the difference between a reference signal and the sum of certain feedback signals, that is, depending on the direction of deviation of the feedback sum of the reference signal. The feedback signals may include a signal proportional to the variable and anticipatory signals proportional to the rate of change of the controlled variable and/or the rate of rate of change of the controlled variable. The two states of the output signal of the bistable device operate through amplifiers to reversibly energize the field of the generator so that positive or negative forcing is always being applied to the generator field. Current limiting bistables are also part of the regulator and they operate to override the controlled variable bistable when the forward or reverse current in the motor circuit exceeds certain limits. The current limit reference for this bistable is varied with changes in the generator voltage. The current limiting bistable also has anticipatory signals, in this case proportional to the rate of change of current so as to provide smooth operation of the regulator. The optimum response regulator will be operative even at zero speeds so as to prevent creep of the motor.

The apparatus of this invention will become more apparent by reference to the attached drawings in which:

FIG. 2 is a diagrammatic showing of the circuit in FIG. 1;

Figure 1A:
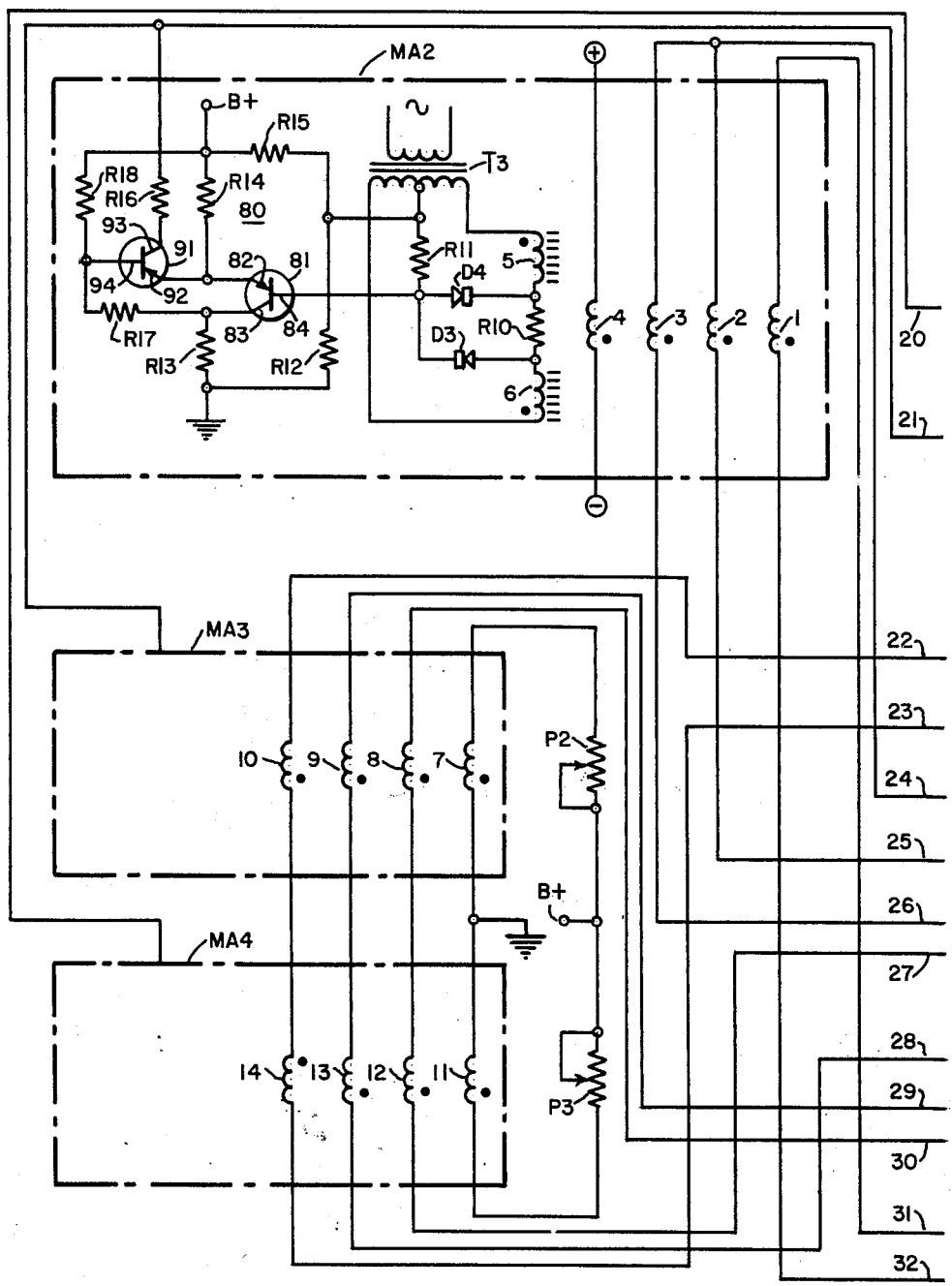
FIGURE 1 (A and B) is a schematic showing of a speed regulator using the principles of the present invention.

In the drawings, the manner in which the windings have been wound upon their associated saturable magnetic cores has been denoted by the polarity dot convention, that is, current flowing into the polarity dot end of a winding will drive the associated core towards positive saturation. Current flowing out of the polarity dot end of a winding will drive the associated core away from positive saturation.

Figure 1B:
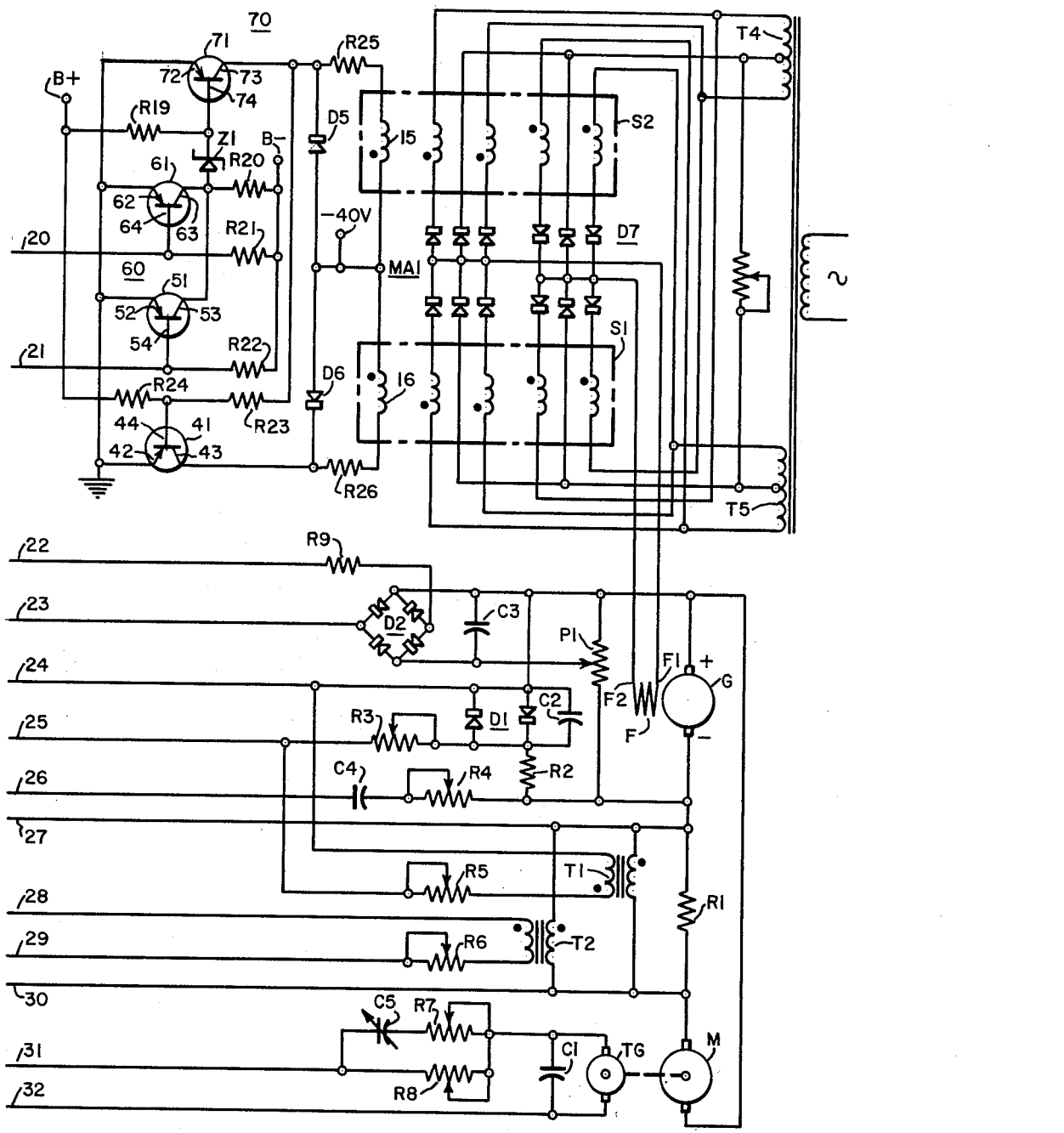

In FIG. 1, a Ward-Leonard motor control system is shown which will be controlled by the regulator of the present invention. The Ward-Leonard system consists of a generator G in series circuit relation with a motor M and a resistance R1. The generator G is controlled by its field F. Power is reversibly supplied to the generator field F by a push-pull magnetic amplifier MA1. The push-pull magnetic amplifier MA1 is designed to supply one value, the maximum effective value, of voltage to the field F with either terminal F1 positive and F2 negative or vice versa. Changing the direction of the field voltage of the generator F tends to reverse the output voltage of the generator G. The push-pull magnetic amplifier MA1 which controls the power supplied to the field winding F consists of two saturable cores S1 and S2 having windings associated therewith and supplied from respective transformers T4 and T5 associated with a common alternating current supply. The windings of the saturable cores S1 and S2 are connected through diodes D7 to the field winding F. It will be noted that although the core S1 or S2 is shown as a single core it is well known in the art that these may be multiple core devices. The push-pull magnetic amplifier MA1 is controlled by two input windings 15 and 16 which are supplied from a common −40 volt power supply. These inputs actually act as an off bias, keeping the respective side of the push-pull magnetic amplifier off while the other side where an input is not applied is in saturation. Thus, it can be seen that if core S2 is kept from saturation by supplying power to control winding 15, then core S1 is saturated and power will flow through the field winding F from terminal F1 to terminal F2. It may also be seen that if core S2 is saturated by reason of power being supplied to winding 16 associated with S1, electrical power will be supplied to the field F through the terminal F2 to the terminal F1. It will be assumed that if power is fed through the field F from F1 to F2 that terminal F1 will be positive and the polarity of the generator output voltage will be as shown in the figure and vice versa. For future reference, we establish the definition: if F1 is kept positive and F2 is kept negative, the resulting change of motor speed is termed "forward acceleration" whereas reversing the polarity across terminals F1 and F2 leads to "reverse acceleration."

The direction of flow of power to the generator field F will be determined by the output state of the bistable magnetic amplifiers MA2, MA3 and MA4.

The purpose of the regulator is to control a variable of the motor M. In the particular embodiment shown in FIG. 1, the controlled variable is speed. In this embodiment, the bistable magnetic amplifier MA2 is used as the speed regulating bistable. The speed regulating bistable MA2 has a winding 4 associated therewith to which is applied a current proportional to a desired speed. This signal could come from a master controller or from a computer which in effect controls the speed of the motor M.

The windings 1, 2 and 3 of the speed regulating bistable MA2 are feedback windings and are controlled as follows. A tachometer generator TG is mechanically connected to the motor M to give an output D.C. signal proportional to the speed of the motor M. A filtering capacitor C1 is connected across the output of the tachometer generator TG and an impedance network is connected to one terminal of the tachometer generator TG. The impedance network consists of a resistance R8 and a series resistance-capacitance circuit consisting of resistance R7 and capacitor C5 connected in parallel with resistance R8. Feedback winding 1 is connected through conductor 31 to one terminal of the impedance network, and through conductor 32 to the tachometer generator TG. Therefore, feedback winding 1 receives a signal proportional to the speed of the motor M and a signal proportional to the change in speed with respect to time, or the acceleration of the motor M. The speed signal is achieved by the circuit consisting of the tachometer generator, the resistance R8 and the feedback winding 1, and the acceleration signal is achieved through the circuit of the tachometer generator TG, the resistance R7, the differentiating capacitor C5 and the feedback winding 1. The reason for the acceleration signal will be explained below.

A transformer T1 is connected across the resistance R1 so that the voltage across its primary winding will be proportional to the current in the system. The transformer T1 is used to differentiate this current signal. The secondary of the transformer T1 is connected through a resistance R5 to the line 25, winding 2 of the bistable device MA2 and back to line 24. Since the angular acceleration of the motor M is proportional to the current, the signal received by the winding 2 from the differentiating transformer T1 is proportional to the rate of change of the acceleration with respect to time of the motor M. The reason for obtaining this signal will also be explained below.

A second signal is also applied to feedback winding 2. A resistance R2 is connected in series with a full-wave rectifier consisting of two diodes D1 back-to-back in parallel across the output terminals of the generator G. A capacitor for filtering purposes is placed across the oppositely poled diodes D1. The voltage across the diodes D1 feeds the feedback winding 2 through a variable resistance R3. The diodes D1 are designed such that they will not pass current easily in their forward direction until a certain voltage is reached. In other words, they act as a high resistance for voltage values below a certain value and maintain a constant voltage for any signals above that said value. Thus, for values of generator voltage below say 2 volts, a signal will be applied to the feedback winding 2 proportional to the generator voltage. For any substantial voltage, say above 2 volts, the voltage across diodes D1 reaches saturation and the feedback signal derived therefrom does not vary with the generator G armature voltage.

The feedback winding 3 is connected through line 24 to one terminal of the generator G and through line 26, differentiating capacitor C4 and resistance R4 to the other terminal of the generator G. Thus, feedback winding 3 receives a signal proportional to the rate of change of the armature voltage which like the signal proportional to the rate of armature current is proportional to the rate of change of the acceleration of the motor M.

Since this device is to be utilized as a very accurate speed regulator, it is necessary to have more than just a speed reference and a feedback signal proportional to the speed. It is necessary to have anticipatory signals to tell the regulator when the speed of the motor is approaching the reference so as to compensate for the time delay in the motor generator system. In a speed regulator system for a Ward-Leonard system, such as is shown in FIG. 1, there are two time delays to compensate for. One is the time delay between operation on the field of the generator and achieving a desired power change in the armature of the motor and a second is the time delay between receiving the desired armature current of the motor and an appropriate change in the speed of the motor. The first of these time delays is compensated for by the signal proportional to the rate of change of speed or the acceleration signal applied to feedback winding 1. The second anticipatory signal is achieved by the signal proportional to the rate of change of armature current and/or the rate of change of armature voltage, which signal is proportional to the rate rate of change of speed of the motor. Either one or both of these last-mentioned signals could be used to get the anticipatory signal proportional to the rate of change of acceleration.

The speed regulating bistable magnetic amplifier MA2 comprises two magnetic amplifiers associated with load windings 5 and 6, respectively. Each of these load winding 5 and 6 has inductively disposed thereto control windings 1, 2, 3 and 4. A transformer T3 supplied from an alternating current source is connected to drive the gating circuit of the magnetic amplifier. A load or gating circuit for the magnetic amplifier associated with winding 5 comprises one half of the secondary winding of transformer T3, gating winding 5, diode D4 and resistance R11. The load or gating circuit for the magnetic amplifier associated with load winding 6 comprises the other half of the secondary of transformer T3, load winding 6, diode D3 and load resistor R11. The resistor R10 is placed between load windings 5 and 6 for biasing purposes. The magnitude of the biasing signal determined by R10 is sufficient to set the flux level in the cores of the two magnetic amplifiers so that when the sum of the signals applied to the control windings 1, 2, 3 and 4 is zero, the magnetic amplifiers will saturate, or "fire" at 90°, that is, on a reset half cycle the bias current will reset the flux level in the respective cores to a point where on the next half cycle the supply or gating voltage from the transformer T3 will require substantially one half of a half cycle or 90° to saturate the respective core. Thus, there would be no output voltage signal across resistance R11.

A Schmitt trigger circuit 80 is actuated by the voltage across R11. This trigger comprises a pair of three electrode-transistor devices 81 and 91. The transistor 81 comprises a semiconductive body having an emitter electrode 82, a collector electrode 83 and a base electrode 84. The transistor 91 comprises a semiconductive body having an emitter elecrode 92, a collector electrode 93 and a base electrode 94. The emitter electrodes 82 and 92 are connected through a resistor R14 to a B+ power supply. The collector electrode 83 is connected through a feedback resistor R17 to the base electrode 94 of the transistor 91. The base electrode 84 is connected to one terminal of the resistance R11. The base electrode 94 is connected through a resistance R18 to the B+ power supply. The center tap of the transformer T3 is connected through a resistance R15 to the B+ supply and through a resistance R12 to ground. The collector of transistor 84 is connected through a resistance R13 to ground and the collector 93 is connected through a resistance R16 to the line 21.

The operation of the magnetic amplifier MA2 is as follows. As hereinbefore described, the two magnetic amplifiers associated with the load windings 5 and 6, with no control signal present, have been biased to fire at 90°, that is, the outputs of the load windings 5 and 6 will fire at 90° and the voltages thereafter produced will oppose each other across resistance R11, and thus no output voltage will be transmitted to the transistor 81. If the sum of the feedback voltage on windings 1, 2 and 3 is greater than the reference voltage on winding 4, then the magnetic amplifier whose load winding is 5 will fire just before 90° and the magnetic amplifier associated with load winding 6 will fire just after 90°. The magnetic amplifier whose load winding is 5 will be driven slightly more towards positive saturation while the magnetic amplifier whose load winding is 6 will be driven slightly away from positive saturation because of the effect of the sum of the voltages on the feedback windings. There will then appear across resistor R11 a voltage signal which will apply a negative voltage to the base of transistor 81.

It is assumed that in the Schmitt trigger circuit 80, the transistor 91 has been conducting and the transistor 81 has been cut off. The voltage dividing network comprising the resistor R15 and the resistor R12 has applied a bias voltage to the base electrode 84 of a proper polarity to keep the transistor 81 biased to nonconduction. However, when the output across the resistor R11 goes negative as hereinbefore described, it is of the proper polarity in magnitude to drive this transistor 81 to conduction, that is, towards saturation. This allows conduction in the emitter 82, collector 83 circuit of the transistor 81 which will feed back a signal through the resistor R17 to the base electrode 94 of the transistor 91 which is of the polarity to start driving the transistor 91 towards "cutoff." As conduction through the emitter 92, collector 93 circuit of the transistor 91, decreases, the potential on the emitter electrode 82 of the transistor 81 rises. This potential rise on the emitter 82 of the transistor 81 effectively raises the bias potential between the emitter 82 and the base electrode 84 of the transistor 81 allowing it to be driven further towards saturation. The two effects just described cooperate to produce a snap-action switching operation of the Schmitt trigger 80.

When at a later time, the reference signal on winding 4 exceeds the sum of the signals on the feedback windings 1, 2 and 3, the polarity of the output across resistor R11 is reversed which stops the conduction of the transistor 81, allowing the transistor 91 to conduct in its emitter 92, collector 93 circuit.

Thus, when the reference signal is greater than the sum of the feedback signals, transistor 91 conducts in its collector 93, emitter 92 circuit and by definition has a "one" output. When the reference signal is less than the sum of the feed back signals, the transistor 91 is cut off and there is no conduction in its emitter collector circuit and by definition there is a "zero" output signal. Thus amplifier MA2 provides either a "one" or a "zero" output depending on the sign of the difference between the reference signal and the feedback signals, that is, depending on the direction of difference or deviation of the feedback signals from the reference signal.. The forward and reverse current limiting bistable magnetic amplifiers MA3 and MA4 are substantially similar to the speed regulating bistable magnetic amplifier MA2 and, therefore, for simplicity purposes, have been shown as boxes with only the feedback and reference windings described in detail. For a more complete description of a bistable transistorized magnetic amplifier, such as MA2, MA3 or MA4, reference should be had to the application of Roland W. Roberts et al., Serial No. 782,017, filed December 22, 1958, and entitled Bistable Amplifier Circuit.

Bistable magnetic amplifier MA3 is utilized as a reverse current limiter, and bistable magnetic amplifier MA4 is used as a forward current limiter. Reference windings 7 and 11 of the respective amplifiers MA3 and MA4 are supplied from a 20 volt source through their respective variable resistors P2 and P3. These inputs actually act as an off bias, keeping the respective side of the push-pull magnetic amplifier off, while the other side where an input is not applied is in saturation. Thus, the current signal in the windings 7 and 11 represents the desired maximum values for the forward and reverse current with zero armature voltage.

In order to vary the forward and reverse current limits in accordance with changing armature voltage, and, specifically, reduce the armature current limit with increasing armature voltage, an armature voltage signal is applied to windings 10 and 14 of magnetic amplifiers MA3 and MA4, respectively. Windings 10 and 14 are connected through line 22 and series resistance R9 to one terminal of a diode bridge D2 and through line 23 to the other terminal of diode bridge D2. The diode bridge D2 is filtered by a capacitor C3 and is energized by one portion of a potentiometer P1 connected across the armature of the generator G.

Figure 3:
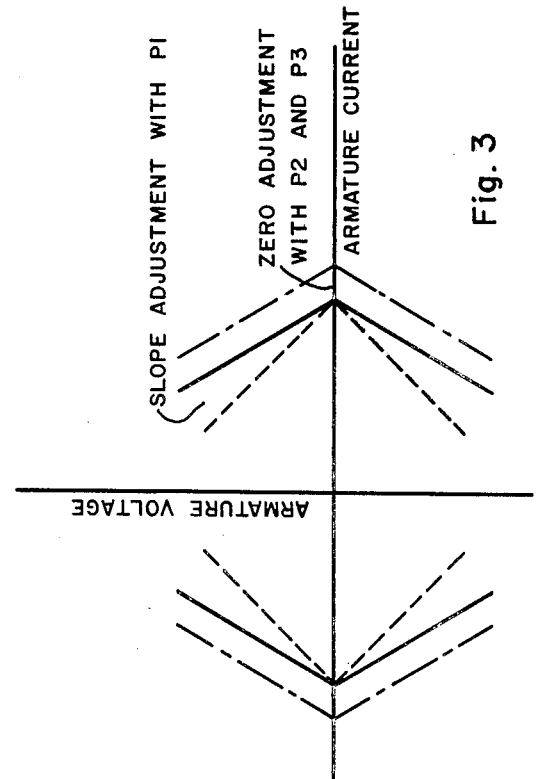
FIG. 3 is a graphic display of the four quadrant current limiting action of the present invention.

Windings 7 and 10 of bistable magnetic amplifier MA3 and windings 11 and 14 of bistable magnetic amplifier MA4 combine to perform a current limited reference function. This four quadrant current limiting characteristic is shown in FIG. 3 on a curve of armature voltage versus armature current. It can readily be seen that the value of forward and reverse current limits with zero armature voltage may be changed by adjusting potentiometers P2 and P3. It can also readily be seen that the slope of the current limiting characteristic can also be varied by adjusting potentiometer P1.

Feedback windings 8 and 12 of the bistable magnetic amplifiers MA3 and MA4, respectively, have impressed thereon through conductors 27 and 30 a signal proportional to the current flowing in resistor R1 or the armature current in the system. An anticipatory signal which will anticipate the reaching of the current limit by the Ward-Leonard system is obtained by utilizing a differentiating transformer T2 whose secondary is connected through resistance R6 and lines 29 and 28 to the feedback windings 13 and 9 of the bistable magnetic amplifiers MA4 and MA3, respectively. This signal is proportional to the rate of change of the armature current.

The reverse current limiter MA3 is set up so that if the reference signal is greater than the sum of the feedback signals the output to line 21 is "one." If the reference signal is less than the sum of the feedback signals, the output of the reverse current limiting bistable magnetic amplifier is "zero." Thus, it can be seen that the motor control system has exceeded its reverse current limitation if the output of the magnetic amplifier MA3 is "one" and vice versa. The forward current limiting bistable magnetic amplifier MA4 is set up so that if the reference signal exceeds the sum of the feedback signals its output will be a "one," and if the reference signal is less than the sum of the feedback signals, its output will be "zero." From this it can also be seen that the forward current limiting magnetic amplifier MA4 will put out a "one" signal until the current in the Ward-Leonard system exceeds the limitation set out and then will switch to "zero." Thus, if the Ward-Leonard system is not exceeding its forward or reverse current limitation, the output of the reverse current limiting bistable magnetic amplifier MA3 will be a "zero" and the output of the forward current limiting bistablem agnetic amplifier MA4 will be a "one." The output of the forward current limiting bistable magnetic amplifier MA4 is applied to line 20.

The signals from lines 20 and 21 feed an AND cricuit 60. The AND circuit 60 consists of two three-electrode semiconductive devices 51 and 61, the three-electrode semiconductive device 51 having an emitter 52, collector 53 and base 54, and the three-electrode semiconductive device 61 having an emitter 62, a collector 63 and a base 64. The base 54 is connected to line 21 and the base 64 is connected to line 20. The base 54 is also connected through a resistance R22 to the B— supply and the base 64 is also connected through a resistance R21 to the B— supply. The collectors 53 and 63 are connected through a resistance R20 to the B— supply. The emitters 62 and 52 are connected to ground. The collector electrode 63 is connected through a Zener diode Z1 to a flip-flop circuit 70. The flip-flop circuit 70 consists of two three-terminal semiconductive devices 71 and 41. The emitters 72 and 42 of the semiconductive devices 71 and 41, respectively, are connected to ground. The collector 73 of semiconductive device 70 is connected through a resistance R23 to the base 44 of the semiconductive device 41. The base 44 is connected through a resistance R24 to the B+ supply and the base 74 of the semiconductive device 71 is connected through a resistance R19 to the B+ supply. The collector 73 of the semiconductive device 71 is also connected through resistance R25 and winding 15 of push-pull magnetic amplifier MA1 to the —40 volt supply and the collector 43 of semiconductive device 41 is connected through resistance R26 and winding 16 of the magnetic amplifier MA1 to the —40 volt supply. The Zener diode Z1 is connected between the collector 63 and the base 74.

The operation of the AND circuit 60 and the flip-flop circuit 70 is as follows. With "zero" signals on lines 20 and 21, semiconductor devices 51 and 61 are conductive due to the fact that their bases are negative with respect to their emitters. This means that there is little voltage at collector 63 to ground and that base 74 will be positive with respect to emitter 72. This keeps the semiconductive device 71 cut off and therefore applies a negative signal from the —40 volt supply to the base 44 of the semiconductive device 41. This negative signal saturates the semiconductor device 41 and allows it to conduct in its collector 43, emitter 42 circuit. When this occurs, a circuit is complete between the negative —40 volt supply through the winding 16, resistance R26, collector 43, emitter 42 to ground, thus driving core S1 from saturation. No current will flow through the winding 15 as the semiconductive device 71 is cut off. Therefore, core S2 will be in saturation. If a "one" signal is received on line 21, it will only act to cut off semiconductive device 51, thus drawing all the current from the B— supply through the collector 63, emitter 62 circuit of semiconductive device 61 and no signal will be applied to the base 74 which would change the state of the flip-flop 70. However, if "one" signals are received on both lines 20 and 21, both semiconductive devices 61 and 51 would be cut off and the voltage at collector 63 would rise to the negative B— supply. This would cause current to flow out of the base 74 saturating it and making the collector 73, emitter 72 circuit conductive. Since the collector 73 voltage would drop towards ground, the B+ supply would cut off the semiconductive device 41. This action would stop the flow of current through winding 16 of core S2 and allow the flow of current from the positive ground through emitter 72, collector 73, resistor R25 and winding 15 to the —40 volt supply.

In order to get a better picture of the operation of the present invention as applied to the speed regulator, reference should be now made to FIG. 2 in which is shown the regulator of the present invention in diagrammatic form and to the chart of operation of the regulator which is shown below.

| | MA2 | MA3 | MA4 | N₂ | N₁ | F₁ | F₂ | Effect |
|---|---|---|---|---|---|---|---|---|
| Fwd. Run: | | | | | | | | |
| Speed<Ref | 1 | 0 | 1 | 1 | 0 | + | — | Increase Fwd. Speed. |
| Speed>Ref | 0 | 0 | 1 | 0 | 1 | — | + | Decrease Fwd. Speed. |
| Fwd. Run+Acceleration—Current at Fwd. Limit. | 1 | 0 | 0 | 0 | 1 | — | + | Limit Positive Current. |
| Fwd. Run+Deceleration—Current at Rev. Limit. | 0 | 1 | 1 | 1 | 0 | + | — | Limit Negative Current. |
| Rev. Run: | | | | | | | | |
| Speed<Ref | 0 | 0 | 1 | 0 | 1 | — | + | Increase Rev. Speed. |
| Spped>Ref | 1 | 0 | 1 | 1 | 0 | — | + | Decrease Rev. Speed. |
| Rev. Run+Acceleration—Current at Rev. Limit. | 0 | 1 | 1 | 1 | 0 | + | — | Limit Negative Current. |
| Rev. Run+Deceleration—Current at Fwd. Limit. | 1 | 0 | 0 | 0 | 1 | — | + | Limit Positive Current. |

In FIG. 2, the bistable magnetic amplifiers MA2, MA3 and MA4 receive the same signals as were described with reference to FIG. 1. The outputs shown on this figure are those which would indicate normal forward acceleration of the motor with the current between the forward and reverse limits. The outputs of the bistable magnetic amplifiers MA2 and MA3 are fed to a non-exclusive OR circuit which is the equivalent of line 21 in FIG. 1. The output of the OR circuit 21 is fed along with the output of the bistable magnetic amplifier MA4 to the AND circuit 60. The output of the AND circuit 60 controls the operation of the flip-flop element 70. The two outputs of the flip-flop element 70 are inverted by their respective NOT circuits N1 and N2 before being fed to their respective magnetic amplifiers S2 and S1. These magnetic amplifiers supply the power to the field F of the generator G, not shown. The "one" on the output of the magnetic amplifier S1 is used to denote the fact that the terminal F1 of the field F is positive and "zero" at the output terminal of the magnetic amplifier S2 is used to denote that the terminal F2 of the field F is at a negative potential. The operation of the speed regulator with current limiting override can thus be seen by a study of the chart of operation shown above.

It will be noted that none of the bistable magnetic amplifiers MA1, MA2, MA3 or MA4 is operative to have a linear range so that their output is either a "one" or a "zero". Thus the output of amplifier MA1 is either a fixed-value positive signal or a fixed-value negative signal. This means that the field of the generator F is constantly being regulated by being reversed at a random rate which is limited by the speed of response of the magnetic amplifiers. It can be understood by anyone skilled in the art that although the applied voltage to the field of the generator is being reversed, the field does not have time to collapse and therefore in actual operation all that is happening is that the flux in the field is being forced to change in a given direction in as short a period of time as the limitations of the generator structure will allow. This is the optimum response control described in the objects of the invention. The use of static switching elements has enabled the invention to be continuously operative even, as mentioned previously, at zero speed. It will be noted that this type of regulator might be applied to other electrical machinery, such as the motor field, while still using the principles of the present invention. It will also be obvious that the regulator of the present invention may be utilized for regulating other controlled variables of a Ward-Leonard system such as the voltage and this will be shown in FIG. 4.

Figure 4:
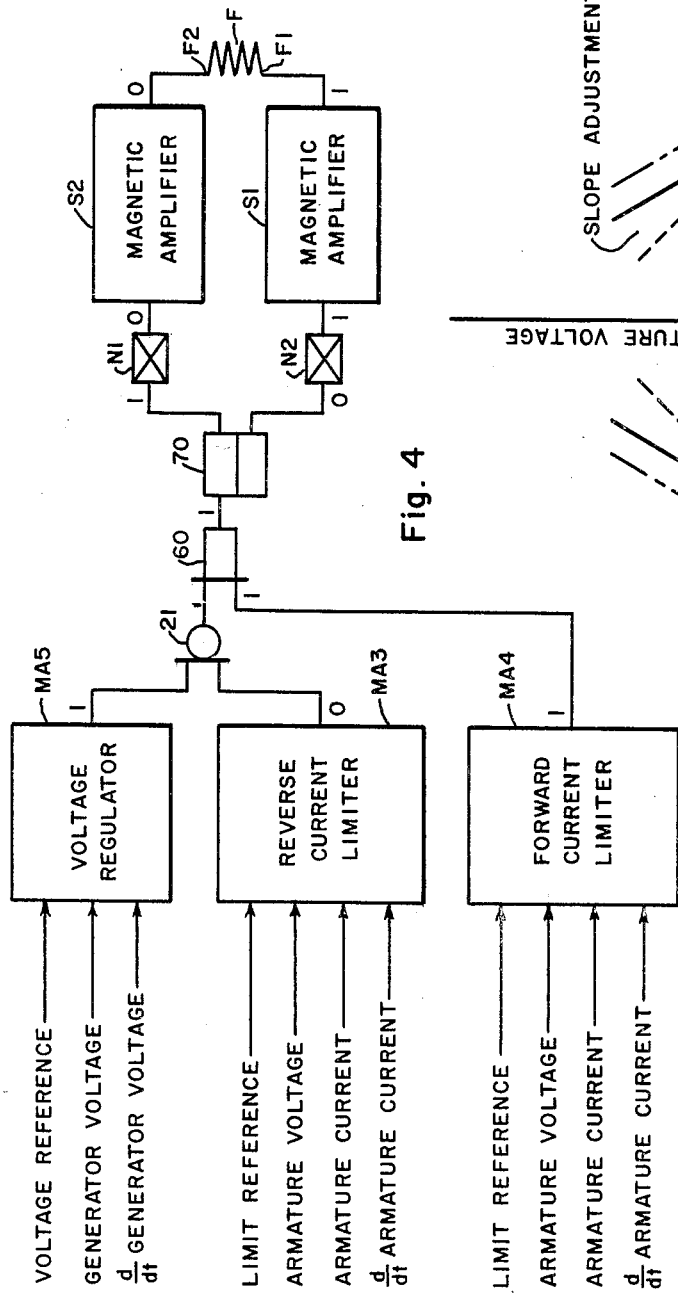
FIG. 4 is a diagrammatic showing of the present invention utilized as a voltage regulator.

The diagrammatic showing of the invention described in FIG. 4 is similar in all respects to the speed regulator diagrammatic showing in FIG. 2 with the exception of the voltage regulating bistable magnetic amplifier MA5 which has been substituted for the speed regulating bistable magnetic amplifier MA2 of FIG. 2. Since this system has been chosen to regulate generator voltage, the following signals are necessary to control the voltage regulator bistable magnetic amplifier MA5. First a voltage reference signal is applied to ascertain a desired generator voltage. Two feedback signals are applied in opposition to the voltage reference. The first is a signal proportional to the actual generator voltage and taken across the armature of the generator. The second feedback signal is an anticipatory signal proportional to the rate of change of generator voltage. This is necessary because of the time delay between the applying of a signal to the generator field and the subsequent change in the generator field and the subsequent change in the generator voltage. Since there are no other delays in this system, no other anticipatory signals are necessary. The digits shown on the outputs of the various elements of the system indicate normal increase of generator voltage with no current limiting problems. The operation of the system is analogous to that of the speed regulator and its chart of operation would be similar to the chart of operation for the speed regulator shown previously.

While some particular embodiments of the invention have have been illustrated and described in detail, it is to be particularly understood that the invention is not intended to be limited thereto or thereby.

I claim as my invention:

1. A regulator for controlling the speed of a motor connected in series circuit relation with a generator by controlling the field of said generator and comprising a static bistable power supply means adapted to reversibly supply a fixed amount of voltage to the said generator field in response to the respective stable states of the bistable means, speed sensing means adapted to supply an output signal proportional to the speed of the motor, signal comparison means including a reference signal proportional to a desired speed and operable to control said static bistable supply means to reversibly supply said fixed amount of voltage in accordance with the sign of the difference between said reference signal and the output signal of said speed sensing means, static current limiting means adapted to override said signal comparison means when the current supplied by said generator exceeds preset values of current, and voltage compensating means responsive to the voltage supplied by said generator to said motor for reducing said preset value as said voltage increases and for increasing said preset value as said voltage decreases.

2. In a system for regulating a controlled variable condition of an electrodynamic power system, supply means for supplying electrical current and voltage to said power system, regulating means responsive to variations of said condition from a desired norm for controlling said supply means to such values as required to regulate said condition to said norm, current limiting means for limiting the upper value of the current supplied by said supply means to said power system, said current limiting means being operable to reduce said current in response to said current exceeding a preset value, and means responsive to said voltage for affecting said current limiting means to reduce said preset value when said voltage increases and to increase said preset value when said voltage decreases.

3. In a control system for regulating an electrodynamic power system, electric power supply means operable to supply a fixed-value positive electrical forcing signal and a fixed-value negative electrical forcing signal to said power system dependent upon which type of forcing is required, first control means responsive to a variable condition of said power system for controlling said supply means to supply one or the other of said forcing signals in response respectively to deviations of said condition in one or the opposite direction from a predetermined norm, second control means for overriding said first control means and controlling said supply means to limit the current supplied thereby to said system in response to said current exceeding a preset value, and means responsive to a variable voltage of said power system for affecting said second control means to reduce said preset value as said voltage is increased and to increase said preset value as said voltage is decreased.

4. In a control system for regulating an electrodynamic power system, two-state static power supply means which in one state supplies a fixed-value positive electrical signal to said power system and in the other state supplies a fixed-value negative electrical signal to said power system, first static bistable means for controlling said power supply means in response to a variable condition of said power system, said first bistable means assuming one of its stable states in response to deviation in one sense of said variable condition of said power system from a norm and its other stable state in response to deviation of said condition from said norm in opposite sense, said power supply means assuming one of its states in response to one stable state of the first bistable means and its other state in response to the other stable state of the first bistable means, and second static bistable current limiting means for overriding said first bistable means and controlling said power supply means to reduce current supplied thereby to the power system in response to said current exceeding a preset value, said second bistable means assuming one stable state in response to current supplied by said power supply means to the power system being above a preset value and its other stable state in response to said current being below said preset value, said first bistable means being abruptly overridden in response to said second bistable assuming its said one stable state.

5. In a control system for regulating an electrodynamic power system, two-state power supply means which in one state supplies a fixed-value positive electrical signal to said power system and in the other state supplies a fixed-value negative electrical signal to said power system, first static bistable means for controlling said power supply means in response to a variable condition of said power system, said first bistable means assuming one of its stable states in response to deviation in one sense of said variable condition of said power system from a norm and its other stable state in response to deviation of said condition from said norm in opposite sense, said power supply means assuming one of its states in response to one stable state of the first bistable means and its other state in response to the other stable state of the first bistable means, second static bistable current limiting means for overriding said first bistable means and controlling said power supply means to reduce current supplied thereby to the power system in response to said current exceeding a preset valve, said second bistable means assuming one stable state in response to current supplied by said power supply means to the power system being above a preset value and its other stable state in response to said current being below said preset value, said first bistable means being abruptly overridden in response to said second bistable assuming its said one stable state and means for affecting said current limiting means to vary said preset value in response to a variable voltage of said power system.

6. In a control system for regulating an electrodynamic power system, two-state power supply means which in one state supplies a discrete fixed-value electrical signal to said power system and in the other state supplies a discrete different fixed-value electrical signal to said power system, first static bistable means for controlling said power supply means in response to a variable condition of said power system, said first bistable means assuming one of its stable states in response to deviation in one sense of said variable condition of said power system from a norm and its other stable state in response to deviation of said condition from said norm in opposite sense, said power supply means assuming one of its states in response to one stable state of the first bistable means and its other state in response to the other stable state of the first bistable means, current limiting means for limiting the upper value of the current supplied to said power system by said power supply means, said current limiting means including second static bistable means for overriding said first bistable means and controlling said power supply means to reduce current supplied thereby to the power system in response to said current exceeding a preset value, said second bistable means assuming one stable state in response to current supplied by said power supply means to the power system being above a preset value and its other stable state in response to said current being below said preset value, said first bistable means being abruptly overridden in response to said second bistable assuming its said one stable state, and means responsive to a variable voltage of said power system for affecting said current limiting means to reduce said preset value as said voltage increases and to increase said preset value as said voltage decreases.

7. In a control system for regulating the speed of a motor fed by a generator, two-state static power supply means which in one state supplies a fixed-value positive electrical signal to said generator and in the other state supplies a fixed-value negative electrical signal to said generator, first static bistable means for controlling said power supply means in response to the speed of said motor, said first bistable means assuming one of its stable states in response to deviation in one sense of said speed from a norm and its other stable state in response to deviation of said speed from said norm in opposite sense, said power supply means assuming one of its states in response to one stable state of the first bistable means and its other state in response to the other stable state of the first bistable means, and current limiting means for limiting the upper value of the current supplied by the generator to the motor, said current limiting means including second static bistable means for overriding said first bistable means and controlling said power supply means to reduce the current supplied by the generator to the motor in response to said current exceeding a preset value, said second bistable means assuming one stable state in response to said current being above a preset value and its other stable state in response to said current being below said preset value, said first bistable means being abruptly overridden in response to said second bistable assuming its said one stable state.

8. In a control system for regulating the speed of a motor fed by a generator, two-state power supply means which in one state supplies a fixed-value positive electrical signal to said generator and in the other state supplies a fixed-value negative electrical signal to said generator, first static bistable means for controlling said power supply means in response to the speed of said motor, said first bistable means assuming one of its stable states in response to deviation in one sense of said speed from a norm and its other stable state in response to deviation of said speed from said norm in opposite sense, said power supply means assuming one of its states in response to one stable state of the first bistable means and its other state in response to the other stable state of the first bistable means, current limiting means for limiting the upper value of the current supplied by the generator to the motor, said current limiting means including second bistable current limiting means for overriding said first bistable means and controlling said power supply means to reduce current supplied by the generator to the motor in response to said current exceeding a preset value, said second bistable means assuming one stable state in response to said current supplied by said generator to the motor being above a preset value and its other stable state in response to said current being below said preset value, said first bistable means being abruptly overridden in response to said second bistable assuming its said one stable state, and means responsive to the generator output voltage for affecting said current limiting means to reduce said preset value as said voltage is increased and to increase said preset value as said voltage is decreased.

References Cited in the file of this patent

UNITED STATES PATENTS

| | | |
|---|---|---|
| 2,554,695 | Brown | May 29, 1951 |
| 2,600,308 | Lund et al. | June 10, 1952 |
| 2,659,040 | Halter | Nov. 10, 1953 |
| 2,833,974 | Carlson | May 6, 1958 |
| 2,993,158 | Dolphin et al. | July 18, 1961 |
| 3,019,379 | Zarleng | Jan. 30, 1962 |
| 3,079,539 | Guerth | Feb. 26, 1963 |
| 3,083,327 | Byloff | Mar. 26, 1963 |
| 3,089,991 | Stamm | May 14, 1963 |
| 3,095,530 | Woodward | June 25, 1963 |

FOREIGN PATENTS

| | | |
|---|---|---|
| 1,093,885 | Germany | Dec. 1, 1960 |
| 285,907 | Switzerland | Sept. 30, 1962 |